April 9, 1935.  W. E. SHEHAN ET AL  1,997,086
MOUNTING FOR WIND WINGS
Filed Nov. 24, 1931
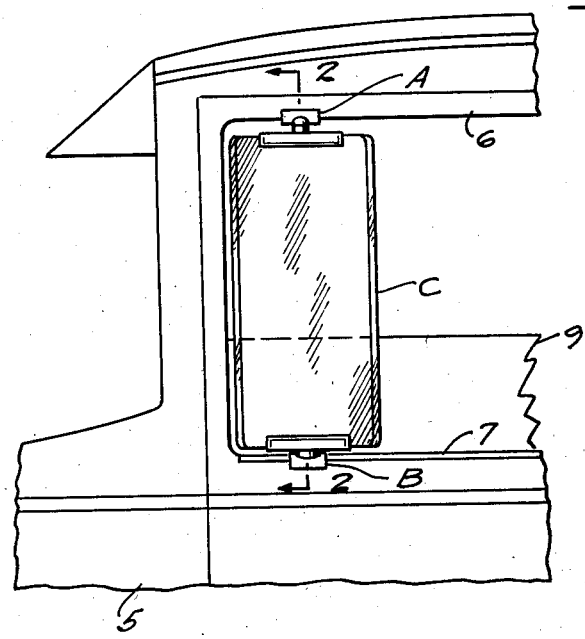
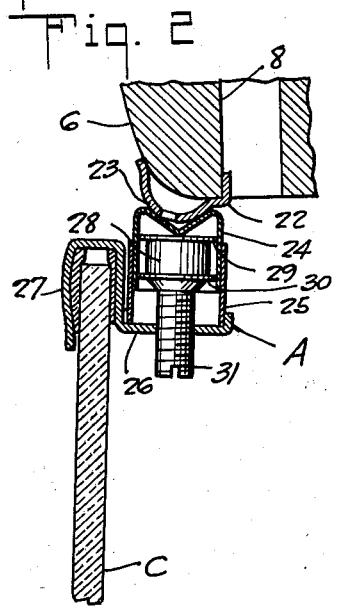
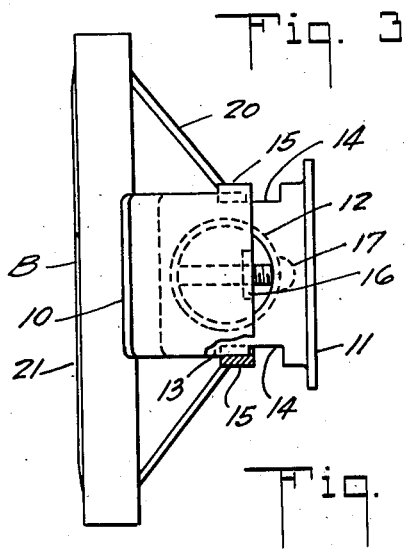
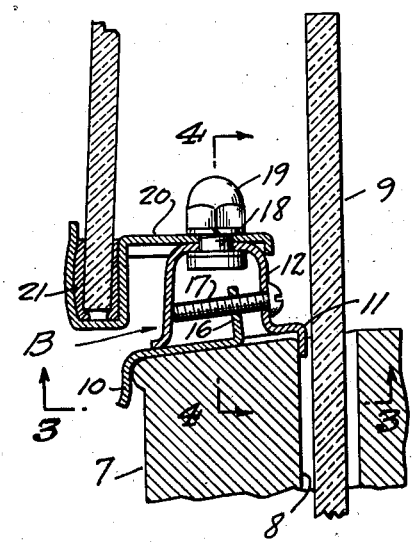
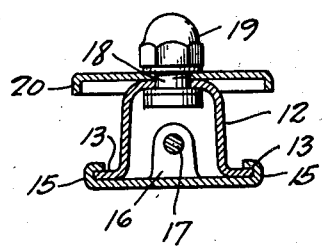
INVENTORS
William E. Shehan
Godfrey Bell
BY Westall and Wallace
ATTORNEYS Patented Apr. 9, 1935

1,997,086

UNITED STATES PATENT OFFICE 1,997,086

MOUNTING FOR WIND WINGS

William E. Shehan and Godfrey Bell, Los Angeles, Calif.

Application November 24, 1931, Serial No. 577,002

6 Claims. (Cl. 296—84)

The invention relates to a wind wing adapted to be mounted at windows of vehicles, such as automobiles, for deflecting air currents away from passage through the window opening and preventing drafts. The invention appertains more particularly to the mounting whereby the wing may be installed at a window opening and be supported on opposite ledges thereof.

The invention has for its objects any or all of the following features: a simple mounting which is compact; a mounting which is self-aligning in installation and adjusts itself to weaving or warping of the frame; a mounting which enables adjustable swinging of the pane; and a mounting bracket having an adjustable foot to accommodate it to ledges of various widths.

An embodiment of the invention is illustrated in the accompanying drawing, in which:—

Fig. 1 is a side view of a fragment of an automobile with a wind wing installed at the front window; Fig. 2 is a section on an enlarged scale as seen on the plane 2—2 of Fig. 1, a portion being broken out to make the view more compact; Fig. 3 is a bottom plan view of the wind wing and bracket having an adjustable foot; and Fig. 4 is a section as seen on the plane 4—4 of Fig. 2.

Referring with more particularity to the drawing, Fig. 1 shows one of the wings mounted on the forward door of an automobile. Similar wings may be mounted upon other doors, if desired. The automobile body 5 has a window opening formed by a frame including upper and lower ledges marked respectively 6 and 7. A runway 8 for the window pane 9 is provided. This is the standard construction for automobile bodies. At the upper ledge of the window frame is a bracket A and at the lower ledge is a bracket B. A glass pane C is clamped between the brackets.

Bracket B comprises a foot having a toe portion with a toe 10 to overhang the outer face of the lower ledge, a heel portion with a heel 11 to engage in the runway 8, and a dome 12. The heel portion has out-turned flanges 13 with cut-aways 14. The toe portion has tongues 15 bent to form grooved slide-ways of such length as to be passed through cut-aways 14. A tongue standard 16 upstands from the rear end of the toe portion and has a threaded bore to receive a screw 17. A bolt 18 is passed through a bore in the top of the dome and a nut 19 holds a clamping member 20 provided with a channel 21 for receiving the pane C, suitable backing being disposed in the channel to protect the pane. The dome 12 forms a bearing member for clamping the member 20 which may be swung about the pintle formed by the bolt 18 to adjust the angular position of the pane C. The toe and heel portions are assembled by passing tongues 15 through cut-aways 14 and expanding the bracket so that the flanges 13 are disposed in slide-ways 15. The screw 17 is engaged with the standard 16 so that the distance between toe and heel may be adjusted.

The other bracket A comprises a foot 22 having a ball end 23. A telescopic post comprises slidably nested tubular members 24 and 25. The tubular member 24 has a socket to receive the ball end 23 and secured to the tubular member 25 is a pane clamping member 26 having a channel 27 to receive the pane C. Within the telescopic post is a rubber compression plug 28 tending to expand the post. Washers 29 and 30 are disposed over the ends of the plug 28. An adjustment screw 31 threaded in the member 26 provides for varying the pressure upon the plug 28 in urging expansion of the post.

In the installation of the wind wing, the bracket A is placed in position against the upper ledge of the window frame with the foot 22 resting thereon and the ball end 23 seated in the socket of the post. The bracket B is placed against the lower face of the window frame, the screw 17 being turned to adjust the bracket to the ledge. The bearing axes of the bracket are placed substantially in alignment. The telescopic post is resiliently expansible and the pane C is placed in position. Obviously, the resilient post in the bracket A will accommodate itself to the length of the pane and will hold the latter against any weaving or warping which may occur in the body at the window frame. It also accommodates itself to any inaccuracies in placement of the brackets. The ball and socket joint in the bracket A provides self-alignment for the swinging axis of the wind wing. It is also apparent that if the door frame is not rectangular but deviates therefrom, that the brackets will align and accommodate themselves to the form of the window so that binding of the wind wing in swinging will not occur. The bracket B is easily assembled and disassembled. It provides a single bracket which may be accommodated to various widths of ledge and does away with the necessity of a multiplicity of brackets B for various windows.

What we claim is:

1. A wind wing comprising brackets adapted for mounting on the window frame of an automobile on opposite ledges thereof; one of said brackets comprising a foot to rest on a ledge of said frame and including a heel portion and a toe portion, one of said portions having an upstanding bearing member with side flanges having cut-aways, the other portion having tongues forming channel slide-ways to receive said flanges and thereby provide an expansible foot, said tongues being insertable through said cut-aways, a standard having a threaded bore on the portion not having the bearing member, there being a bore in said bearing member aligned with the bore in said standard, an adjustment screw passing through said bores, and a pane clamping member pivotally mounted on said dome having at one side a channel for a pane.

2. A wind wing comprising brackets adapted for mounting on the window frame of an automobile on opposite ledges thereof; one of said brackets comprising a foot to rest on a ledge of said frame and including a heel portion and a toe portion, one of said portions having an upstanding dome with side flanges having cut-aways, the other portion having tongues forming channel slide-ways to receive said flanges and thereby provide an expansible foot, said tongues being insertable through said cut-aways, a standard having a threaded bore on the portion not having the dome, said standard being housed in said dome, there being a bore in said dome aligned with the bore in said standard, an adjustable screw passing through said bore, and a pane clamping member pivotally mounted on said dome having at one side a channel for a pane.

3. A wind wing comprising brackets adapted for mounting one the window frame of an automobile on opposite ledges thereof; one of said brackets comprising a foot to rest on a ledge of said frame and including a heel portion having an upstanding bearing member with side flanges having cut-aways, a toe portion having tongues forming channel slide-ways to receive said flanges and thereby provide an expansible foot, said tongues being insertable through said cut-aways, a standard on said toe portion having a threaded bore, there being a bore in said bearing member aligned with the bore in said standard, an adjustment screw passing through said bores, and a pane clamping member pivotally mounted on said dome having at one side a channel for a pane.

4. A wind wing comprising brackets adapted for mounting on the window frame of an automobile on opposite ledges thereof; one of said brackets comprising a foot to rest on a ledge of said frame and including a heel portion having an upstanding dome with side flanges having cut-aways, a toe portion having tongues forming channel slide-ways to receive said flanges and thereby provide an expansible foot, said tongues being insertable through said cut-aways, a standard on said toe portion housed in said dome and having a threaded bore, there being a bore in said dome aligned with the bore in said standard, an adjustment screw passing through said bores, and a pane clamping member pivotally mounted on said dome having at one side a channel for a pane.

5. A wind wing comprising brackets adapted for mounting on the window frame of an automobile on opposite ledges thereof; one of said brackets comprising a foot to rest on a ledge of said frame and including a heel portion having an upstanding dome with side flanges having cut-aways, a toe portion having tongues forming channel slide-ways to receive said flanges and thereby provide an expansible foot, said tongues being insertable through said cut-aways, a standard on said toe portion housed in said dome and having a threaded bore, there being a bore in said dome aligned with the bore in said standard, an adjustment screw passing through said bores, a pane clamping member resting on said dome having at one side a channel for a pane, and a pintle bolt passed through the top of said dome and said clamping member to pivotally secure the latter to said foot.

6. A wind wing comprising brackets adapted for mounting on a window frame on opposite ledges thereof; one of said brackets comprising a foot to rest on a ledge of said frame and including a heel portion hooking over one side of the ledge and a toe portion to hook over the opposite side of the ledge, one of said portions having an upstanding dome with side flanges having cut-aways, the other portion having tongues forming channel slide-ways to receive said flanges and thereby provide an expansible foot, said tongues being insertable through said cut-aways, a standard having a threaded bore upstanding from the portion not having the dome and housed in the latter, there being a bore in said dome aligned with the bore in said standard, a screw extending through said bores to adjustably secure the toe and heel portions together, and pane clamping means pivotally secured to one of said portions.

WILLIAM E. SHEHAN.
GODFREY BELL.